United States Patent
Choi

(10) Patent No.: US 7,203,145 B2
(45) Date of Patent: Apr. 10, 2007

(54) METHOD FOR CONTROLLING RECORDING OPTICAL POWER IN OPTICAL DISC DEVICE

(75) Inventor: Young Do Choi, Kyunggi-do (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 562 days.

(21) Appl. No.: 10/802,818

(22) Filed: Mar. 18, 2004

(65) Prior Publication Data

US 2004/0246836 A1    Dec. 9, 2004

(30) Foreign Application Priority Data

Mar. 18, 2003  (KR)  ............... 10-2003-0016934

(51) Int. Cl.
*G11B 7/00* (2006.01)
(52) U.S. Cl. ............... 369/47.53; 369/53.26; 369/116
(58) Field of Classification Search ............... 369/47.5, 369/47.53, 47.11, 53.26, 116; G11B 5/09, G11B 7/00
See application file for complete search history.

(56) References Cited

U.S. PATENT DOCUMENTS 6,052,347 A * 4/2000 Miyata ............... 369/47.53
6,987,717 B2 * 1/2006 Hagiwara et al. ........ 369/47.53

* cited by examiner

*Primary Examiner*—A M Psitos
(74) *Attorney, Agent, or Firm*—Birch, Stewart, Kolasch & Birch, LLP

(57) ABSTRACT

The present invention relates to a method for controlling recording optical power. When a recording operation is paused, a playback signal characteristic for recorded data is detected. The recording optical power is controlled based upon the detected playback signal characteristic and hence the recording operation is resumed at the controlled recording optical power. Therefore, even though a characteristic of an optical pickup or disc varies when the recording operation is paused and resumed, an optimum recording operation can be performed and a playback characteristic for recorded data can be improved.

10 Claims, 3 Drawing Sheets

METHOD FOR CONTROLLING RECORDING OPTICAL POWER IN OPTICAL DISC DEVICE

This Non-provisional application claims priority under 35 U.S.C. § 119(a) on Patent Application No(s). 10-2003-0016934 filed in Korea on Mar. 18, 2003, the entire contents of which are hereby incorporated by reference.

BACKGROUND OF THE INVENTION

1. Field of the Invention

The present invention relates to a method for controlling recording optical power in an optical disc device.

2. Description of the Related Art

When recording data on a seated optical disc, an optical disc device detects optimum power calibration (OPC) power $P_{opc}$ through an OPC operation for a test area of the optical disc, and performs a recording operation at a requested recording velocity using the detected OPC power $P_{opc}$ and a variable amount $\alpha$ of power for each recording velocity shown in FIG. 1. The variable amount $\alpha$ of power for each recording velocity shown in FIG. 1 corresponds to an experimental value. In case of the recording operation in a constant angular velocity (CAV) mode, as a recording position moves to an outer periphery, the optical disc device increases the recording velocity. According to the increased recording velocity, the optical disc device performs the recording operation while increasing recording optical power to a value of "$P_{opc}+\alpha$".

In a conventional method for controlling recording optical power, when performing the recording operation, the optical disc device controls the recording optical power while referring to only a variable amount of power for each recording velocity predetermined by experimentation. However, the conventional method never takes into account a characteristic change of an optical pickup due to a temperature change or a characteristic change of an inner or outer periphery of the optical disc. Thus, where a characteristic of the optical pickup or disc is changed and the recording operation is paused and resumed, there is a problem in that the recording operation at optimum recording optical power cannot be appropriately performed and hence a playback characteristic of recorded data is degraded.

SUMMARY OF THE INVENTION

Therefore, the present invention has been made in view of the above problems, and it is one object of the present invention to provide a method for controlling recording optical power that can optimally control the recording optical power according to a characteristic change of an optical pickup or disc where a recording operation is paused and resumed.

It is another object of the present invention to provide a method for controlling recording optical power that can control the recording optical power based upon a playback signal of recorded data before a recording operation is paused where the recording operation is paused and resumed.

It is yet another object of the present invention to provide a method for controlling recording optical power that can improve a playback characteristic of recorded data.

In accordance with an aspect of the present invention, the above and other objects can be accomplished by the provision of a method for controlling recording optical power in an optical disc device, comprising the steps of: (a) performing a recording operation at recording optical power determined by a recording characteristic of an optical disc and a recording velocity; (b) where the recording operation is paused, detecting a playback signal characteristic of recorded data; and (c) resuming the recording operation at recording optical power controlled based upon the detected playback signal characteristic.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of a method for controlling recording optical power in an optical disc device in accordance with the present invention will be described in detail with reference to the annexed drawings.

Figure 2:
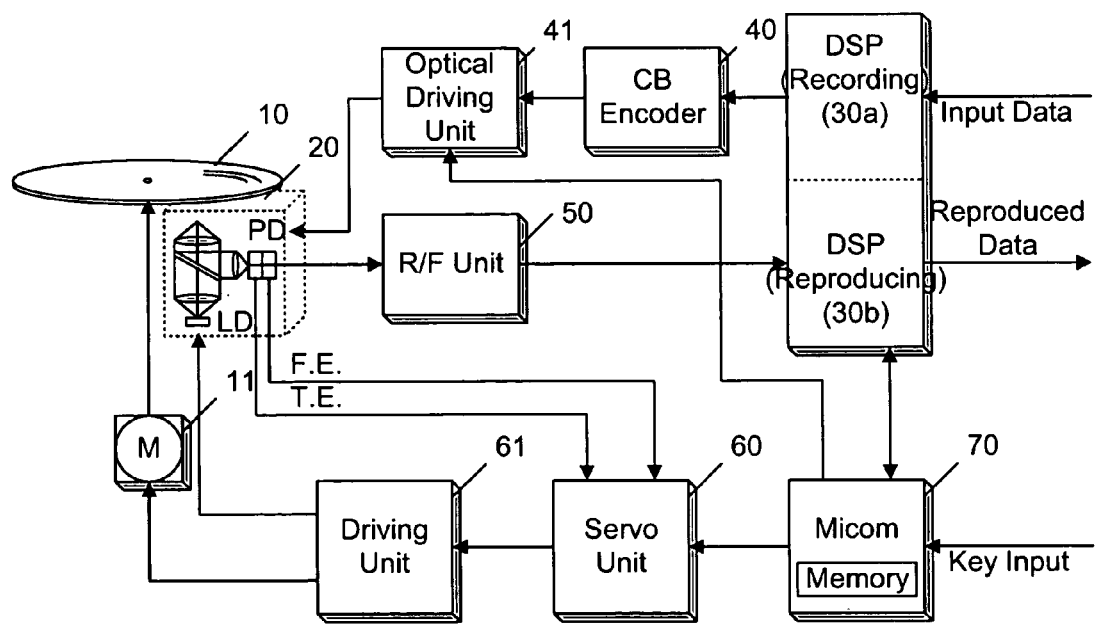
FIG. 2 is a block diagram illustrating the configuration of an optical disc device in which a method for controlling recording optical power is implemented in accordance with the present invention.

FIG. 2 is a block diagram illustrating the configuration of an optical disc device in which a method for controlling recording optical power is implemented in accordance with the present invention. In the optical disc device, a digital signal processor (DSP) 30a for recording adds an error correction code (ECC) block, etc. to inputted digital data, and performs a conversion to a corresponding recording format. A channel bit (CB) encoder 40 encodes, into a bit stream, data converted into the recording format. An optical driving unit 41 controls a record signal for the bit stream at predetermined optical drive power and outputs the controlled record signal. An optical pickup 20 records the controlled record signal on an optical disc 10 or reads a signal of recoded data from a recording area. A radio frequency (RF) unit 50 filters a signal detected from the optical pickup 20, shapes a waveform of the filtered signal, and outputs a binary signal. A driving unit 61 drives a spindle motor M for rotating the optical disc 10 and a sled motor (not shown) for moving the optical pickup 20. A servo unit 60 controls the driving 61 on the basis of a tracking error signal (T.E.), a focusing error signal (F.E.), and a rotation velocity of the optical disc 10. A DSP 30b for playback recovers original data from the binary signal using an internal clock synchronized with a phase of the binary signal. When the recording operation is performed, a microcomputer 70 optimally controls recording optical power using an incremental amount $\alpha$ of power set for each recording velocity and a value $\beta$ detected from a playback RF signal.

Figure 3:
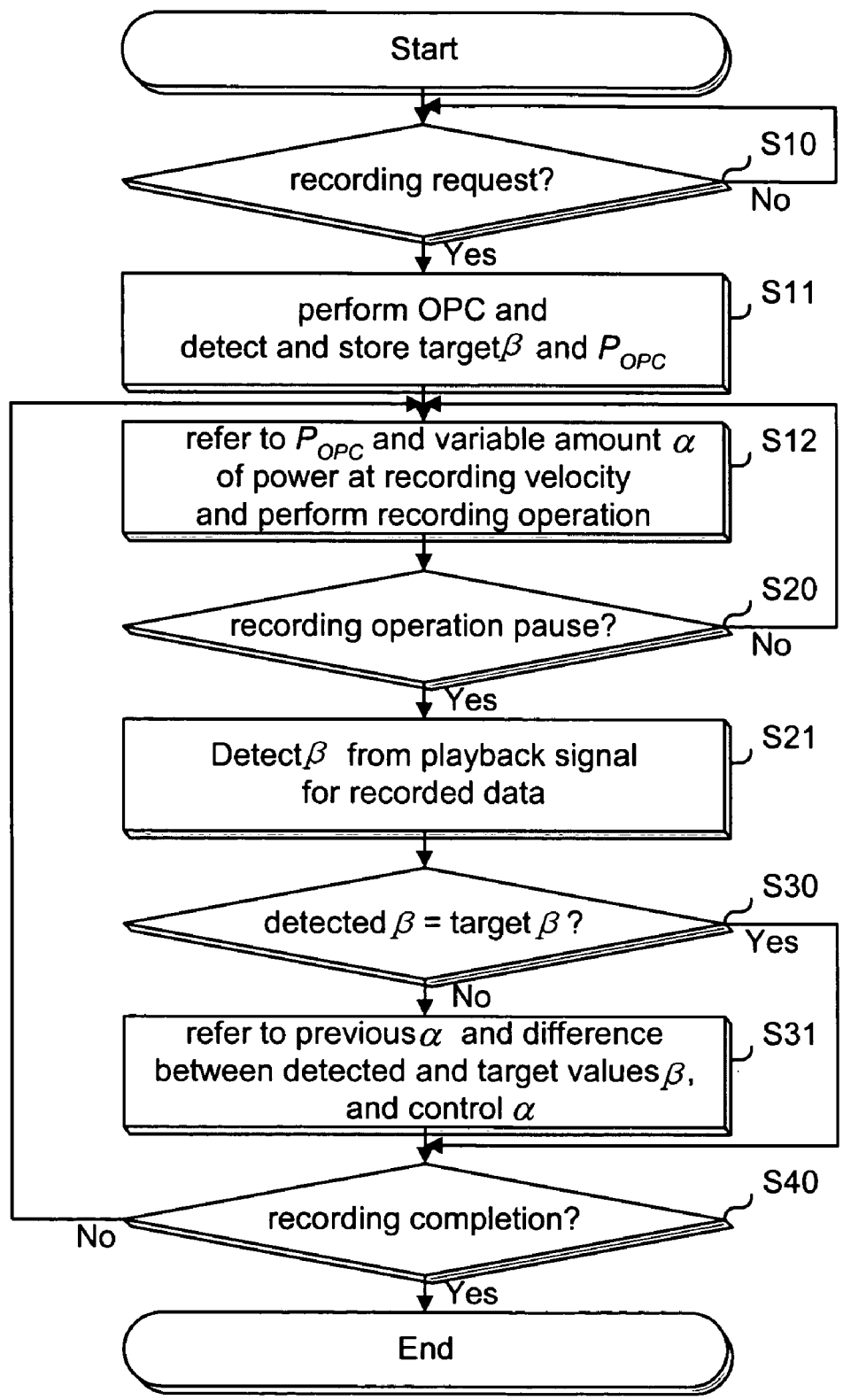
FIG. 3 is a flowchart illustrating the method for controlling recording optical power in accordance with one preferred embodiment of the present invention.

FIG. 3 is a flowchart illustrating the method for controlling recording optical power in accordance with one preferred embodiment of the present invention. The method for controlling recording optical power in accordance with the present invention shown in FIG. 3 will now be described in detail with reference to the configuration shown in FIG. 2.

For example, when a recordable optical disc 10 such as compact disc recordable (CD-R) is seated in the optical disc device and a recording operation is requested (S10), the microcomputer 70 performs an optimum power calibration (OPC) operation in a power calibration area (PCA) before the recording operation. The OPC operation is as follows.

First, the microcomputer 70 applies, to the optical driving unit 41, a control signal necessary for sequentially varying the recording optical power by a predetermined amount of power on the basis of targeted recording optical power (e.g., 8 mW) detected from the optical disc 10. The optical driving unit 41 outputs, to the optical pickup 20, a record signal for test data at controlled optical drive power corresponding to the applied control signal. The optical pickup 20 records the test data of 15 absolute time in pre-groove (ATIP) (=15 blocks) on a test area contained in the PCA.

When the recording operation for the test data has been completely performed, the microcomputer 70 controls the optical pickup 20, sequentially reads the recorded test data, and detects a value β from a playback RF signal outputted from the RF unit 50. The value β is a value indicating asymmetry of the playback RF signal.

When the value β has been completely detected, the microcomputer 70 calculates a function relation between the value β and the recording optical power sequentially varied in response to the control signal. The microcomputer 70 detects a value of optimum power calibration (OPC) power $P_{opc}$ corresponding to a target value $β_{OPC}$ from the function relation and then stores the detected OPC power value $P_{opc}$ and the target value $P_{opc}$ in an internal memory (S11).

Figure 1:
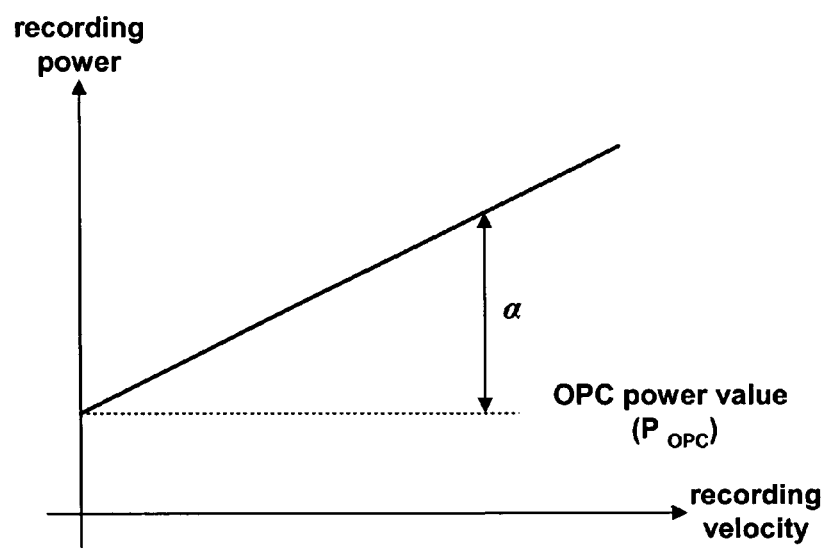
FIG. 1 is a graph illustrating a conventional example of controlling recording optical power in proportion to a recording velocity.

Then, the microcomputer 70 performs the recording operation at the requested recording velocity (S12). The recording optical power for the requested recording velocity is calculated based upon the detected OPC power value $P_{opc}$ and a variable amount α of power for each recording velocity shown in FIG. 1. In a constant angular velocity (CAV) mode, as a recording position moves to an outer periphery, the optical disc device increases a recording velocity. According to the increased recording velocity, the optical disc device performs the recording operation by increasing the recording optical power. The recording operation will now be described in detail.

The DSP 30a for recording encodes inputted data for a reliable recording/playback operation, performs a conversion to a recording format to which an error correction code (ECC) block is added, and outputs a result of the conversion. The CB encoder 40 performs a conversion to the format of a record signal in which a pulse width is modulated so that a digital bit stream outputted from the DSP 30a can be recorded on the optical disc 10, and applies a result of the conversion to the optical driving unit 41.

The microcomputer 70 controls the optical driving unit 41 so that the record signal in which the pulse width is modulated can be outputted at optical drive power corresponding to recording optical power for a current recording velocity. Thus, the optical driving unit 41 appropriately controls the applied record signal in which the pulse width is modulated at the optical driver power and outputs the controlled record signal. The optical pickup 20 performs the recording operation by recording the outputted record signal on the data area of the optical disc 10.

However, when the recording operation is paused (S20), the microcomputer 70 allows the optical pickup 20 to read the last data recorded on the optical disc 10. The microcomputer 70 detects a value β from a playback RF signal outputted from the RF unit 50 (S21), and compares the detected value β ($β_{det}$) with the stored target value β ($β_{OPC}$) (S30).

If the detected value β ($β_{det}$) is equal to the stored target value β ($β_{OPC}$) or a difference between the values is within a predetermined allowable range (as indicated by "Yes" at the above step S30) as a result of the comparison, the microcomputer 70 determines that the OPC power $P_{opc}$ and the variable amount α of power for the recording velocity serve as effective recording optical power for a current recording position or a recording velocity corresponding to the current recording position, such that the recording operation is resumed.

Figure 4:
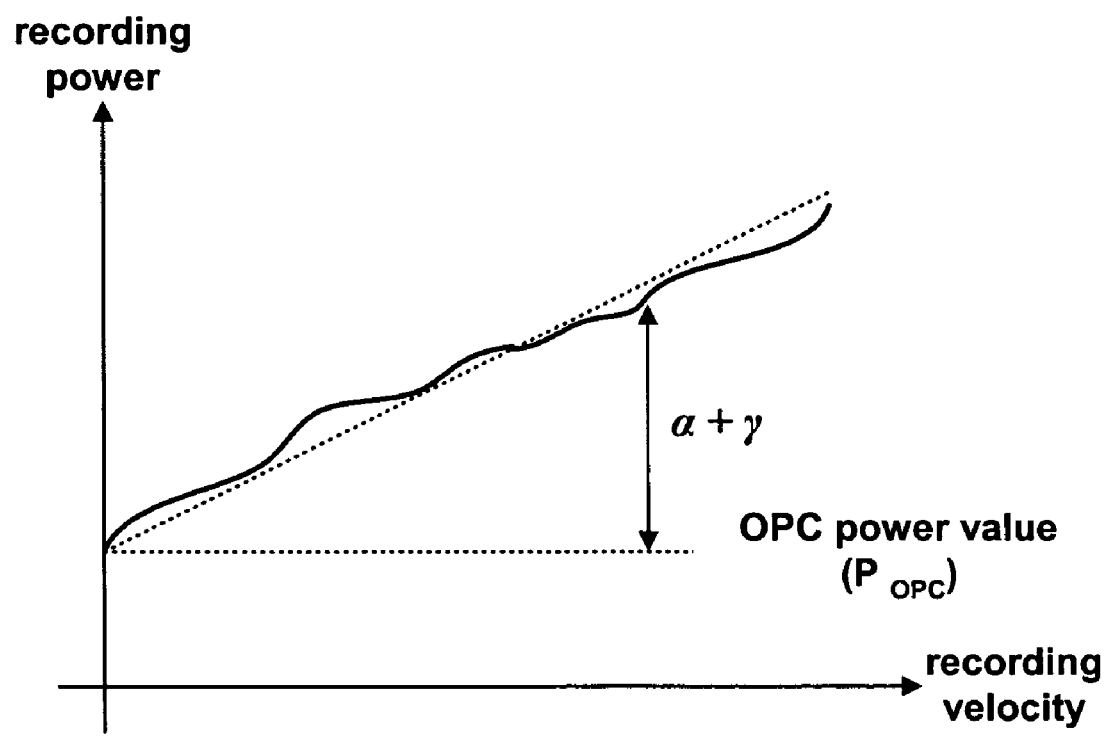
FIG. 4 is a graph illustrating an example of controlling recording optical power in accordance with the present invention.

On the other hand, if a difference between the detected value β ($β_{det}$) and the stored target value β ($β_{OPC}$) is not within the predetermined allowable range (as indicated by "No" at the above step S30) as the result of the comparison, the microcomputer 70 determines that the OPC power $P_{opc}$ and/or the variable amount α of power for the recording velocity do not serve as effective recording optical power for a current recording position or a recording velocity corresponding to the current recording position because of a character change of the optical disc 20 or a characteristic change of an inner or outer periphery of the optical disc 10. Then, the microcomputer 70 maintains the OPC power $P_{opc}$ as it is, refers to the difference between the detected value β ($β_{det}$) and the target value β ($β_{OPC}$), and controls the variable amount α of power for each recording velocity (S31). At this point, the variable amount of power for each recording velocity is controlled to a sum "a+γ" of the variable amount α of power determined by experimentation and a value $γ(=f(α,β_{det}-β_{OPC}))$ determined by the variable amount α of power determined by the experimentation and the difference between the detected value β ($β_{det}$) and the target value β ($β_{OPC}$). The value γ can be $0.2α(β_{det}-β_{OPC})$ by experimentation. Then, until the recording operation is completed (S40), the microcomputer 70 refers to the OPC poser $P_{opc}$ and the controlled variable amount "a+γ" of power for each recording velocity shown in FIG. 4, and resumes the recording operation (at the above steps S31 and S40)

Where there occurs a super link phenomenon due to degradation of a transmission speed of external equipment (e.g., a personal computer (PC)) in course of the recording operation in the above-described embodiment, the microcomputer 70 pauses the recording operation, detects the value β from the lastly recorded data as described above, performs an operation for controlling the variable amount of power for each recording velocity according to the value β, and resumes the recording operation while referring to the controlled variable amount of power for each recording velocity.

It can be found that the embodiment of the present invention described above is similar to a method for controlling recording optical power in a running OPC (ROPC) operation. However, where the recording operation is paused and resumed in accordance with the embodiment of the present invention, a characteristic value of a record signal of data actually recorded on the optical disc 10 is referred to so that recording optical power can be controlled, such that more correct power compensation is achieved in comparison with the above-described ROPC operation.

For reference, the ROPC operation detects a B-level (level of signals reflected from recording light) at a time point that change of medium becomes stabilized. In the ROPC operation, the recording light is continuously controlled so that a value of the detected level on the data area is equal to a value of the detected level on the test area.

As apparent from the above description, the present invention provides a method for controlling recording optical power in an optical disc device that can perform an optimum recording operation even though a characteristic of an optical pickup or disc varies where a recording operation is paused and resumed, such that playback characteristics of recorded data can be improved.

Although the present invention has been described in connection with specific preferred embodiments, those skilled in the art will appreciate that various modifications, additions, and substitutions to the specific elements are possible, without departing from the scope and spirit of the present invention as disclosed in the accompanying claims.

What is claimed is:

1. A method for controlling recording optical power in an optical disc device, comprising the steps of:
   (a) performing a recording operation at recording optical power determined by a recording characteristic of an optical disc and a recording velocity;
   (b) where the recording operation is paused, detecting a playback signal characteristic of recorded data; and
   (c) resuming the recording operation at recording optical power controlled based upon the detected playback signal characteristic.

2. The method as set forth in claim 1, wherein the recording optical power is determined by a sum of fixed optical power determined by the recording characteristic of the optical disc on which the data is to be recorded and a variable amount of power for each recording velocity.

3. The method as set forth in claim 2, wherein the variable amount of power for each recording velocity corresponds to a predetermined experimental value.

4. The method as set forth in claim 2, wherein the optical power determined by the recording characteristic of the optical disc is detected through an optimum power calibration (OPC) operation for the optical disc.

5. The method as set forth in claim 4, wherein the step (a) comprises the steps of:
   (a-1) detecting and storing the value of optical power corresponding to a targeted playback signal characteristic through the OPC operation for the optical disc; and
   (a-2) performing the recording operation at optical power determined by a sum of the stored optical power and the variable amount of power for each recording velocity.

6. The method as set forth in claim 5, wherein the step (c) comprises the steps of:
   (c-1) comparing the detected playback signal characteristic with the targeted playback signal characteristic;
   (c-2) controlling the variable amount of power for each recording velocity using a previous variable amount of power for each recording velocity and a difference between the detected playback signal characteristic and the targeted playback signal characteristic according to a result of the comparison; and
   (c-3) resuming the recording operation based upon a sum of the stored optical power and the controlled variable amount of power for each recording velocity.

7. The method as set forth in claim 6, wherein the step (c-2) is performed only where the difference between the detected playback signal characteristic and the targeted playback signal characteristic is not within a predetermined allowable range.

8. The method as set forth in claim 6, wherein $A2=A1+0.2 \times A1 \times (B2-B1)$ where A2 denotes the controlled variable amount of power for each recording velocity, A1 denotes the previous variable amount of power for each recording velocity before control, B1 denotes the targeted playback signal characteristic, and B2 denotes the detected playback signal characteristic.

9. The method as set forth in claim 1, wherein the pause of the recording operation is caused due to degradation of a transmission speed of external equipment coupled to the optical disc device.

10. The method as set forth in claim 1, wherein the playback signal characteristic corresponds to a value indicating asymmetry of a playback radio frequency (RF) signal.

* * * * *